(12) United States Patent
Fowler et al.

(10) Patent No.: US 12,449,988 B2
(45) Date of Patent: Oct. 21, 2025

(54) DYNAMIC MEMORY RECONFIGURATION

(71) Applicants: ADVANCED MICRO DEVICES, INC., Santa Clara, CA (US); ATI TECHNOLOGIES ULC, Markham (CA)

(72) Inventors: Mark Fowler, Boxborough, MA (US); Anthony Asaro, Markham (CA); Vydhyanathan Kalyanasundharam, Santa Clara, CA (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/756,976

(22) Filed: Jun. 27, 2024

(65) Prior Publication Data
US 2025/0004653 A1    Jan. 2, 2025

Related U.S. Application Data

(63) Continuation of application No. 17/854,903, filed on Jun. 30, 2022, now Pat. No. 12,026,380.

(51) Int. Cl.
G06F 3/06        (2006.01)

(52) U.S. Cl.
CPC .......... *G06F 3/0631* (2013.01); *G06F 3/0604* (2013.01); *G06F 3/0679* (2013.01)

(58) Field of Classification Search
CPC .... G06F 3/0679; G06F 3/0604; G06F 3/0631; G06F 3/0683; G06F 12/0607
USPC .......................................................... 711/154
See application file for complete search history.

(56) References Cited

U.S. PATENT DOCUMENTS

| | | | |
|---|---|---|---|
| 2017/0162235 A1 * | 6/2017 | De ...................... | G06F 12/0607 |
| 2019/0065364 A1 | 2/2019 | Kirvan et al. | |
| 2019/0361807 A1 * | 11/2019 | Desai ...................... | G06F 12/10 |
| 2020/0409876 A1 * | 12/2020 | Leng .................. | H03M 13/2757 |
| 2021/0026767 A1 * | 1/2021 | Park ........................ | G06F 12/12 |
| 2022/0122215 A1 * | 4/2022 | Ray ...................... | G06F 15/8046 |
| 2022/0291871 A1 * | 9/2022 | Lee ...................... | G06F 13/1657 |

OTHER PUBLICATIONS

Extended European Search Report issued in Application No. 23832383.6, mailed Jul. 31, 2024, 11 pages.

* cited by examiner

*Primary Examiner* — Hashem Farrokh

(57) ABSTRACT

A processing system including a parallel processing unit selectively allocating pages of memory for interleaving across configurable subsets of channels based on a mode of allocation. In some embodiments, in a first mode, a page of memory is allocated to and interleaved across a plurality of channels, and in a second mode, a page of memory is allocated to and interleaved across a subset of the plurality of channels.

20 Claims, 6 Drawing Sheets

DYNAMIC MEMORY RECONFIGURATION

CROSS-REFERENCE TO RELATED APPLICATIONS

The present application is a Continuation application of U.S. patent application Ser. No. 17/854,903, entitled "DYNAMIC MEMORY RECONFIGURATION", and filed on Jun. 30, 2022, now issued as U.S. Pat. No. 12,026,380, the entirety of which is incorporated by reference herein.

BACKGROUND

To improve overall processing efficiency, processing systems typically employ multi-channel high bandwidth memory, such as multi-channel Dynamic Random Access Memory (DRAM). For example, such multi-channel memories are often implemented in a processing system such that multiple memory die are accessible in parallel by a host processor in the system. This multi-channel, parallel access typically increases the amount of data that the system is able to read or write in a given time period, allowing for reduced processing delays that in turn increase system performance and increased total capacity of the DRAM.

Multi-channel memory systems are typically configured to store data across multiple memory devices according to an interleaving pattern. Some conventional multi-channel memory systems only utilize a fixed number of channels among which data is interleaved based on the interleaving pattern, according to which data is sequentially stored across the memory devices of the multi-channel memory system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
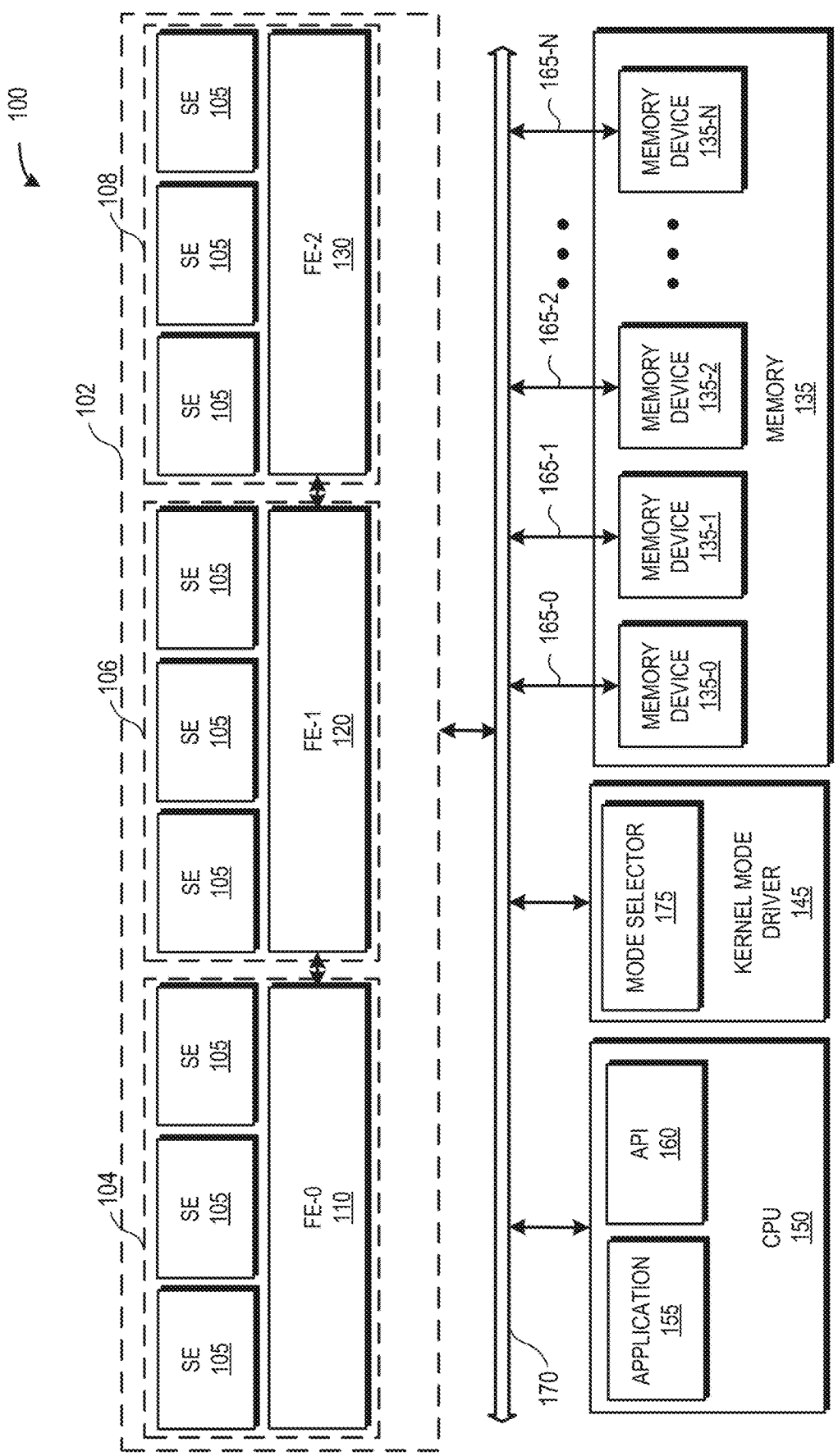
FIG. 1 is a block diagram of a processing system that implements dynamic memory reconfiguration in accordance with some embodiments.

A parallel processing unit such as a graphics processing unit (GPU) includes front end (FE) hardware to handle tasks such as fetching commands, handling jitter, performing geometry operations, and performing ray tracing. The FE hardware typically includes command fetchers, queues such as first-in-first-out (FIFO) buffers to hold fetched commands, and a scheduler that schedules commands from the command buffer for execution on shader engines in the GPU. The shader engines are implemented using one or more processors and one or more arithmetic logic units (ALUs) to execute commands provided by the FE hardware. Results produced by the shaders, such as values of shaded pixels, are output to one or more caches that store frequently used information that is also stored in corresponding memories. The GPU therefore includes memory or registers to hold results, caches, ports, and interfaces between these entities. Information flows from the FE hardware to the memory via paths that include command buses to carry commands from the FE hardware to the shader engines, caches to store output from the shader engines, and memory channels to convey cached information to the memory.

Some GPUs include multiple instances of FE hardware and corresponding shader engines (each such instance is referred to herein as "partitions") that collectively access memory via a plurality of memory channels. In some cases, the partitions are implemented on separate dies and are referred to herein as parallel processing unit chips. Certain data, such as textures and vertex buffers, are shared by all partitions, while other data, such as render targets and thread private memory, are used by only a single partition.

FIGS. 1-7 illustrate techniques for selectively allocating pages of memory for interleaving across configurable subsets of channels of a processing system including a parallel processing unit based on a mode of allocation. In some embodiments, in a first mode, a page of memory is allocated to and interleaved across a plurality of channels, and in a second mode, a page of memory is allocated to and interleaved across a subset of the plurality of channels. For example, in some embodiments, the parallel processing unit accesses memory via 48 channels which are divided among three partitions, each of which accesses memory via 16 channels. In the first mode, a kernel mode driver of the processing system allocates a page of memory that is interleaved across all 48 channels of the parallel processing unit. In the second mode, the kernel mode driver allocates a page of memory to, and interleaves the page across, 16 channels corresponding to a single partition.

In some embodiments the first mode specifies allocating the memory page to a unified memory architecture (UMA) that is shared by all partitions of the parallel processing unit and the second mode specifies allocating the memory page to a non-uniform memory architecture (NUMA) that is private to a single partition of the parallel processing unit. By flexibly allocating and interleaving memory pages across a subset of channels, the processing system maintains separate memory pools that do not interfere with each other. Further, by allocating memory pages to only the partition that requires access, the kernel mode driver reduces transfers from one partition to the next and lowers latency.

In some embodiments, the kernel mode driver selects the first mode in response to the memory page being shared by all partitions of the parallel processing unit. For example, the kernel mode driver selects the first mode in response to the memory page including a texture or a vertex buffer in some embodiments. In other embodiments, the kernel mode driver selects the first mode in response to the memory page including one or more of microcode engines within a central processing unit (CPU) that provides instructions to the parallel processing unit, context save and restore data, and a platform security processor (PSP) state. Conversely, the kernel mode driver selects the second mode in response to the memory page being accessed by a single partition of the parallel processing unit. For example, the kernel mode driver selects the second mode in response to the memory page including thread private memory or a render target.

In some embodiments, the physical address of the memory page includes additional address bits (referred to as apertures) that the kernel mode driver uses to indicate the selected mode. For example, the kernel mode driver indicates use of the first mode at a first physical address aperture and indicates use of the second mode at a second physical address aperture in some embodiments.

FIG. 1 is a block diagram of a processing system 100 that implements dynamic memory reconfiguration for a parallel processing unit such as a graphics processing unit (GPU) 102 according to some embodiments. In various embodiments, the GPU 102 is a parallel processor that includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof.

The processing system 100 includes one or more central processing units (CPUs) 150. Although one CPU 150 is shown in FIG. 1, some embodiments of the processing system 100 include more CPUs. A scalable data fabric (SDF) 170 supports data flows between endpoints within the processing system 100. Some embodiments of the SDF 170 are implemented as a peripheral component interconnect (PCI) bus, PCI-E bus, or other type of bus that supports data flows between connecting points such as peripheral component interface (PCI) physical layers, memory controllers, universal serial bus (USB) hubs, computing and execution units including the GPU 102 and the CPU 150, as well as other endpoints. Components of processing system 100 may be implemented as hardware, firmware, software, or any combination thereof. It should be appreciated that processing system 100 may include one or more software, hardware, and firmware components in addition to or different from those shown in FIG. 1. For example, processing system 100 may additionally include one or more input interfaces, non-volatile storage, one or more output interfaces, network interfaces, and one or more displays or display interfaces. The processing system 100 includes, for example, a server, a desktop computer, laptop computer, tablet computer, mobile phone, gaming console, and the like.

In various embodiments, the CPU 150 is connected via the SDF 170 to a system memory 135, such as a dynamic random access memory (DRAM) that includes multiple memory devices 135-0, 135-1, 135-2, . . . , 135-N, each of which is accessed via a corresponding channel 165-0, 165-1, 165-2, . . . , 165-N. In various embodiments, the system memory 135 can also be implemented using other types of memory including static random access memory (SRAM), nonvolatile RAM, and the like. In the illustrated embodiment, the CPU 150 communicates with the system memory 135 (also referred to as memory 135) and also the GPU 102 over the SDF 170. However, some embodiments of the processing system 100 include the GPU 102 communicating with the CPU 102 over a direct connection or via dedicated buses, bridges, switches, routers, and the like.

The SDF 170 services memory access requests provided by the GPU 102, providing read/write access to the memory 135 and translating physical memory addresses provided in the memory access requests into physical memory locations (e.g., memory blocks) of one or more corresponding memory devices 135-0, 135-1, 135-2, . . . 135-N of the memory 135 via channels 165-0, 165-1, 165-2, . . . , 165-N. In order to translate the physical memory addresses provided in such memory access requests, the SDF 170 references the allocation mode selected by a kernel mode driver 145 to determine which channels 165-0, 165-1, 165-2, . . . , 165-N the physical memory address is mapped to. It should be understood that physical address mapping, as used herein, does not refer to the mapping between virtual addresses and physical addresses, but instead refers to mapping between physical addresses and channels and/or physical memory locations of a given processing system. Herein, the terms "physical address" and "physical memory address" are used interchangeably to refer to an address that points to or is otherwise associated with a particular physical memory location of the memory 135.

As illustrated, the CPU 150 includes a number of processes, such as executing one or more application(s) 155 to generate graphic commands. In various embodiments, the one or more applications 155 include applications that utilize the functionality of the GPU 102, such as applications that generate work in the processing system 100 or an operating system (OS). In some implementations, an application 155 includes one or more graphics instructions that instruct the GPU 102 to render a graphical user interface (GUI) and/or a graphics scene. For example, in some implementations, the graphics instructions include instructions that define a set of one or more graphics primitives to be rendered by the GPU 102.

In some embodiments, the application 155 utilizes a graphics application programming interface (API) 160 to invoke a user mode driver (not shown) (or a similar GPU driver). The user mode driver issues one or more commands to the GPU 102 for rendering one or more graphics primitives into displayable graphics images. Based on the graphics instructions issued by application 155 to the user mode driver, the user mode driver formulates one or more graphics commands that specify one or more operations for GPU 102 to perform for rendering graphics. In some embodiments, the user mode driver is a part of the application 155 running on the CPU 150. For example, in some embodiments the user mode driver is part of a gaming application running on the CPU 150. Similarly, in some implementations the kernel mode driver 145, alone or in combination with the user mode driver, formulates the one or more graphics commands as part of an operating system running on the CPU 150.

The GPU 102 includes three partitions 104, 106, 108. Each partition 104, 106, 108 includes sets of shader engines (SE) 105 that are used to receive and execute commands concurrently or in parallel. In some embodiments, each SE 105 is implemented as a separate die that includes a configurable number of shader engines, in which each shader engine includes a configurable number of work group processors, and each work group processor includes a configurable number of compute units. Some embodiments of the SE 105 are configured using information in draw calls received from one of the CPU 150 to shade vertices of primitives that represent a model of a scene. The SE 105 also shade the pixels generated based on the shaded primitives and provide the shaded pixels to a display for presentation for user, e.g., via an I/O hub (not shown). The GPU 102 further includes a display engine and a PCIe interface in some embodiments. Although three SE 105 are illustrated for each partition 104, 106, 108 such that a total of nine SE 105 are shown in FIG. 1, some embodiments of the GPU 102 include more or fewer partitions and some embodiments of the partitions 104, 106, 108 include more or fewer SE 105.

Each set of SE 105 in a partition 104, 106, 108 is connected to a front end (e.g., front end-0 (FE-0) 110, front end-1 (FE-1) 120, and front end-2 (FE-2) 130) that fetches and schedules commands for processing graphics workloads that are received and executed by the shader engines of the SE 105. The SE 105 of a partition 104, 106, 108 are stacked vertically on top of the corresponding front end FE-0 110, FE-1 120, FE-2 130 of the partition 104, 106, 108 in some embodiments. In some embodiments, each of the FE-0 110, FE-1 120, FE-2 130 are implemented as a separate die. In some embodiments, each of the front end dies FE-0 110, FE-1 120, FE-2 130 includes a graphics L2 cache (not shown) that stores frequently used data and instructions. In some embodiments, the L2 cache is connected to one or more L1 caches that are implemented in the SE 105 and one or more L3 caches (or other last level caches) implemented in the processing system 100. The caches collectively form a cache hierarchy.

Each of the front ends FE-0 110, FE-1 120, FE-2 130 in the GPU 102 fetches primitives for graphics workloads, performs scheduling of the graphics workloads for execution on the SE 105 and, in some cases, handles serial synchronization, state updates, draw calls, cache activities, and tessellation of primitives. Each of the FE-0 110, FE-1 120, FE-2 130 in the GPU 102 includes command processors (not shown) that receive command buffers for execution on the SE 105. Each of the FE-0 110, FE-1 120, FE-2 130 also includes graphics register bus managers (GRBMs) (not shown) that act as hubs for register read and write operations that support multiple masters and multiple slaves. The FE-0 110, FE-1 120, FE-2 130 thus fetch commands for processing graphics workloads for respective sets of SE 105. The SE 105 each include shader engines that are configured to receive and execute the commands from the respective FE-0 110, FE-1 120, FE-2 130. In some embodiments, the GPU 102 operates in two modes (independent of the memory channel allocation modes discussed herein): a first "single partition" mode, in which FE-1 120 drives all the SE 105 while FE-1 110 and FE-2 130 are inactive such that software only interacts with one FE, and a second "triple partition" mode, in which each of FE-0 110, FE-1 120, and FE-2 130 drives its local SE 105, such that each guest is allocated to one FE.

The kernel mode driver 145 includes a mode selector 175 that selects an allocation mode for each memory page. In a first mode, the kernel mode driver 145 allocates the memory page across all the memory channels 165-0, 165-1, 165-2, ..., 165-N such that the memory page is accessible by each of the partitions 104, 106, 108. In a second mode, the kernel mode driver 145 allocates the memory page across a subset of the memory channels 165-0, 165-1, 165-2, ..., 165-N such that the memory page is accessible by only a subset (such as one) of the partitions 104, 106, 108. For example, in some embodiments, the processing system includes 48 memory channels 165-0, 165-1, 165-2, ..., 165-N. If the mode selector 175 identifies that a memory page should be accessible by all of the partitions 104, 106, 108, the mode selector 175 selects the first mode and the memory page is allocated and interleaved across all 48 memory channels 165-0, 165-1, 165-2, ..., 165-N. Conversely, if the mode selector 175 identifies that the memory page should be accessible by only one of the partitions (e.g., partition 104), the mode selector 175 selects the second mode and the memory page is allocated and interleaved across only a subset (e.g., 16) of the channels 165-0, 165-1, 165-2, ..., 165-N corresponding to the partition 104.

If the memory page is allocated to all of the memory channels 165-0, 165-1, 165-2, ..., 165-N, the memory page is interleaved (or "striped") across all of the channels, such that, for example, a first portion of the memory page is transmitted via the first channel 165-0, a second portion is transmitted via the second channel 165-1, a third portion is transmitted via the third channel 165-2, and so on until the Nth portion is transmitted via the Nth channel 165-N, at which point the N+1th portion is transmitted via the first channel 165-0, etc. In some embodiments, the kernel mode driver allocates the memory page across all of the channels but implements a different interleaving pattern.

If the kernel mode driver 145 allocates the memory page across a subset of the memory channels 165-0, 165-1, 165-2, ..., 165-N, the memory page is interleaved across only the subset. For example, if the subset includes three memory channels, the memory page is interleaved such that a first portion of the memory page is transmitted via the first channel 165-0, a second portion is transmitted via the second channel 165-1, a third portion is transmitted via the third channel 165-2, and the fourth portion is transmitted via the first channel 165-0, and so on.

Figure 2:
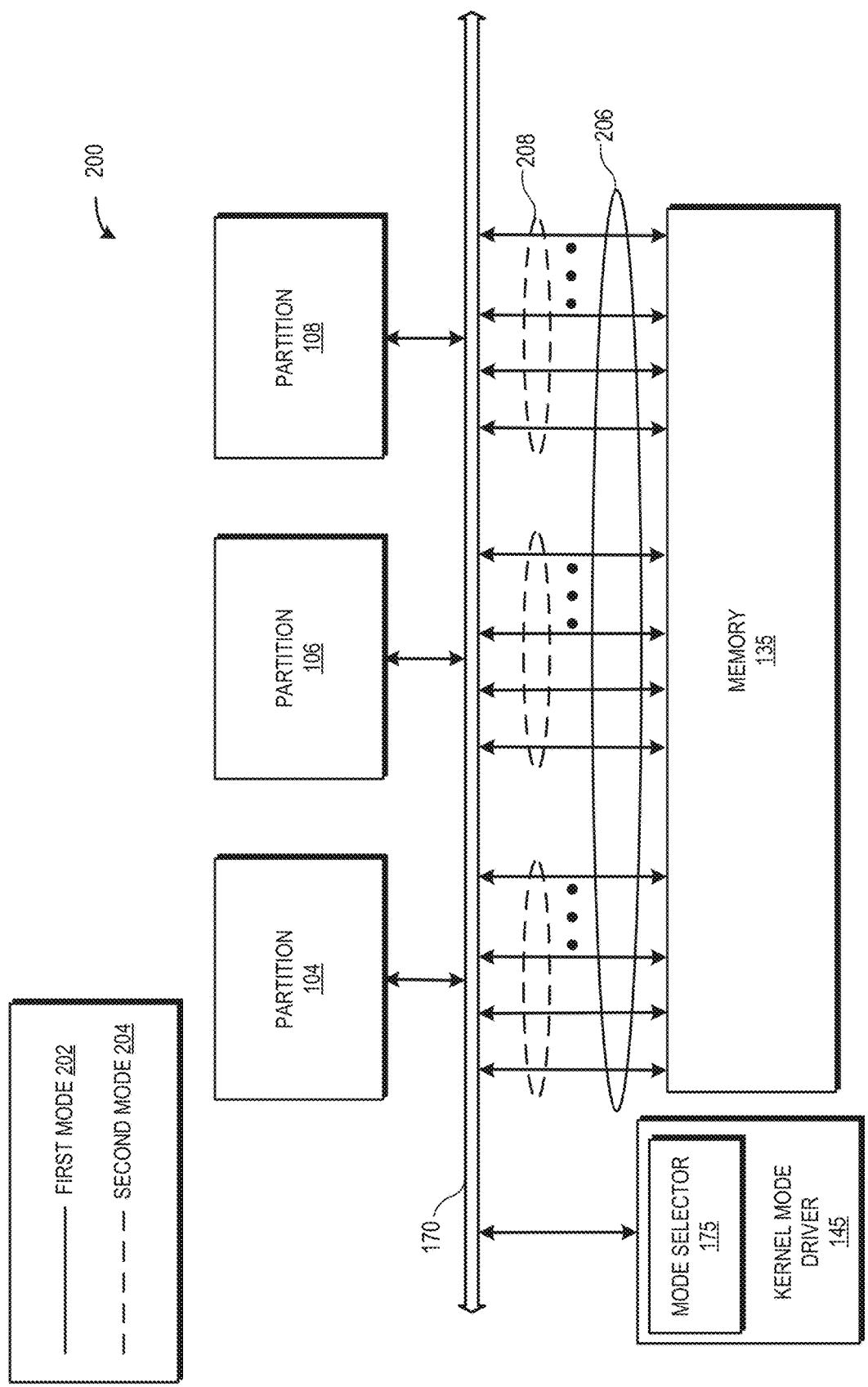
FIG. 2 is a block diagram of allocations of memory across channels based on a mode in accordance with some embodiments.

FIG. 2 is a block diagram 200 of allocations of memory across channels based on a mode in accordance with some embodiments. In a first mode 202, indicated by a solid line, a memory page (not shown) is allocated and interleaved across all of the memory channels 206 between the memory 135 and the SDF 170. In some embodiments, the mode selector 175 selects the first mode 202 in response to identifying that the memory page contains data that should be accessible by all of the parallel processor unit partitions 104, 106, 108. For example, in response to identifying that the memory page includes a texture or a vertex buffer, the mode selector 175 selects the first mode 202 and allocates the memory page across all of the memory channels 206.

In a second mode 204, indicated by a dashed line, a memory page is allocated and interleaved across a subset 208 of the memory channels. In some embodiments, the mode selector 175 selects the second mode 204 in response to identifying that the memory page contains data that should not be accessible by all of the parallel processor unit partitions 104, 106, 108. For example, in response to identifying that the memory page includes a thread private memory or a render target, the mode selector 175 selects the second mode 204 and allocates the memory page across only a subset 208 of the memory channels 206.

Figure 3:
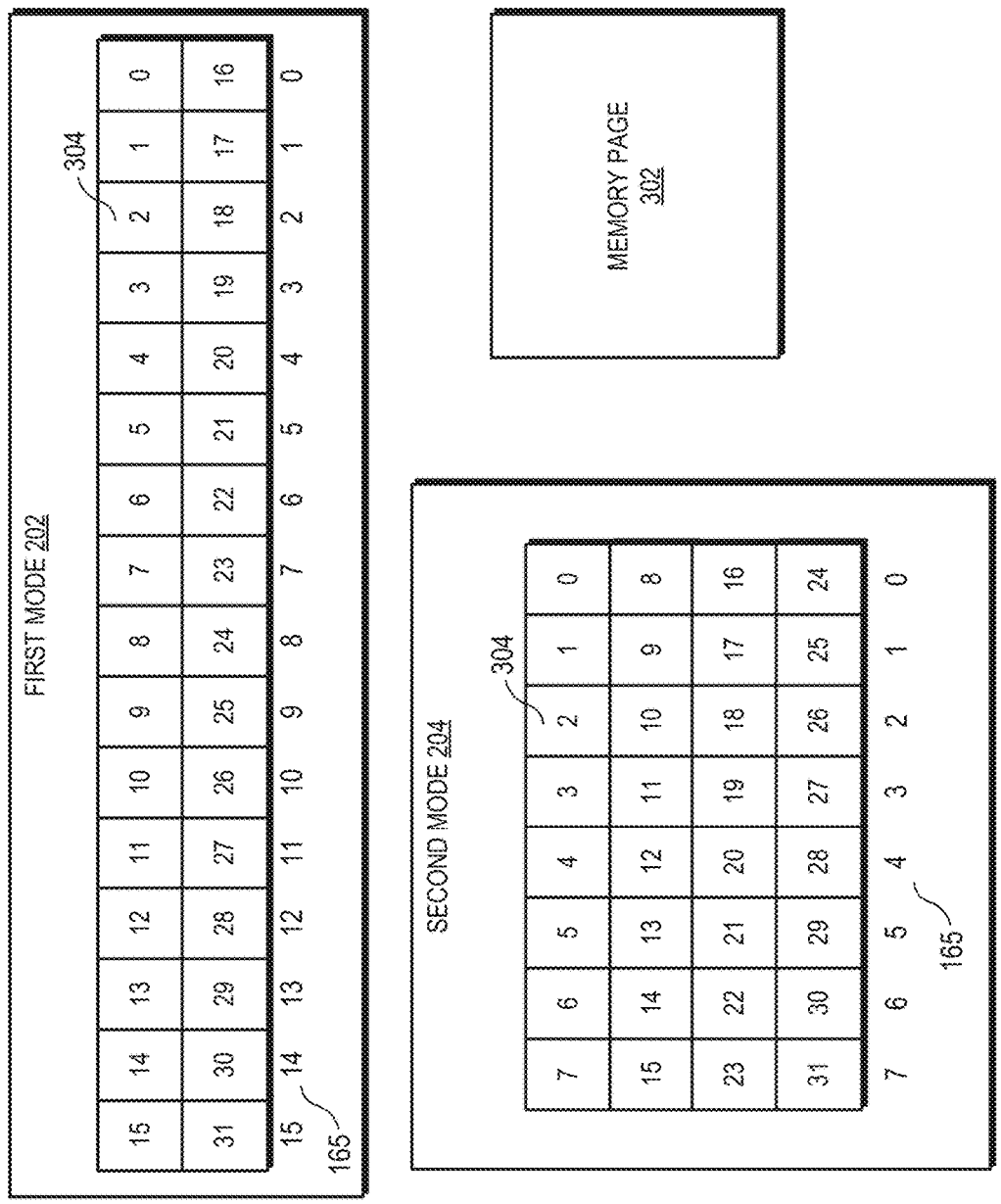
FIG. 3 is a block diagram of interleaving of a memory page across varying numbers of channels based on a mode in accordance with some embodiments.

FIG. 3 is a block diagram 300 illustrating interleaving of a memory page 302 across varying numbers of channels based on a mode in accordance with some embodiments. In the first mode 202, the memory page 302 is allocated to and interleaved across all of the memory channels 165-0 through 165-N, with N=15 in the illustrated example. In the illustrated example, the memory page 302 is divided into 32 portions for interleaving, and the first sixteen portions are allocated to corresponding ones of the memory channels 0 through 15, at which point the interleaving wraps back around such that the seventeenth portion is allocated to memory channel 0, and the interleaving continues in this manner.

By contrast, in the second mode 204, the memory page 302 is allocated to and interleaved across only a subset of the memory channels, 165-0 through 165-7 in the illustrated example. The memory page 302 is divided into the same number of portions as in the allocation according to the first mode 202, such that the first eight portions are allocated to corresponding ones of the memory channels 0 through 7, at which point the interleaving wraps back around such that the ninth portion is allocated to memory channel 0. The interleaving continues in this manner until all 32 portions of the memory page 302 have been allocated to one of the eight channels of the subset of memory channels.

Figure 4:
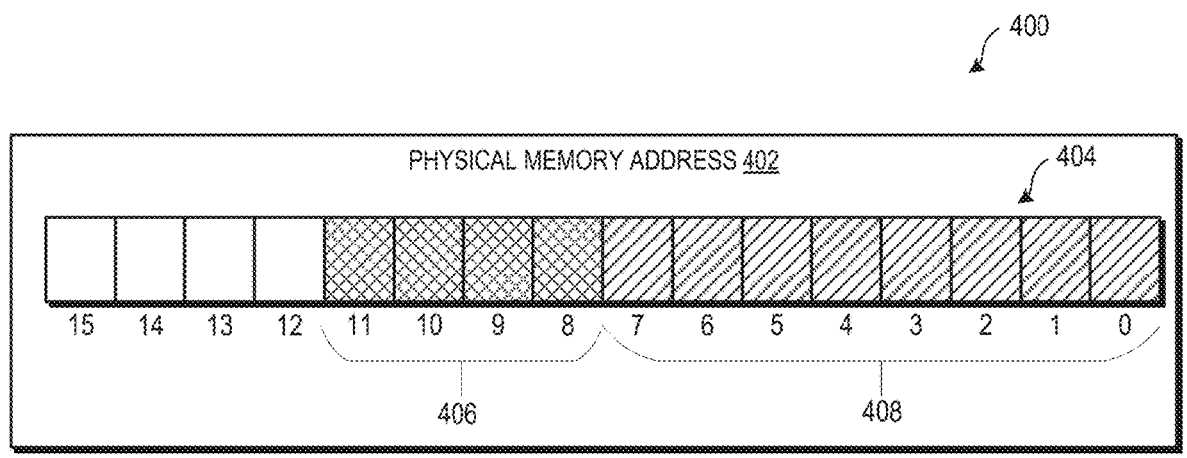
FIG. 4 is a block diagram of an indication at a physical address of a memory page of an allocation based on a first mode in accordance with some embodiments.

FIG. 4 shows a diagram illustrating a representation of an indication 400 of use of the first mode 202 of allocating a memory page to memory channels of a processing system. For ease of illustration, the present example is described with respect to an example implementation of the processing system 100 of FIG. 1 and its constituent components and modules.

A physical memory address 402 is shown here to include an array of bits 404, each associated a respective index. In some embodiments the physical memory address 402, is mapped to all of the channels 165-0, . . . , 165-N based on the respective values of the binary digits at indices 406, referred to herein as a first aperture 406, of the given physical memory address. That is, the channels 165 and, therefore, the memory devices 135-0, . . . , 135-N used to store and retrieve data associated with the physical memory address 402 is selected by the values of the bits at the indices 406. In some embodiments, the values of the bits at the indices 406 are used to select a channel identifier ("channel ID") number associated with a given channel of the channels 165-0, . . . , 165-N.

In the present example, the first interleaving configuration 400, which can be denoted as [11, 10, 9, 8], causes the SDF 170 to map the physical memory address 402 across all of the channels 165-0 through 165-N based on binary digits at indices 11, 10, 9, and 8 of the physical memory address 402. That is, the value of the bits of the physical memory address 402 at indices 11, 10, 9, and 8 are used by the SDF 170 to determine a channel ID number corresponding to one of the channels 165-1, . . . , 165-N to which the physical memory address 402 is to be mapped. As shown, the lowest order 16 bits of the physical memory address 402 are indexed as [15, 14, 13, 12, 11, 10, 9, 8, 7, 6, 5, 4, 3, 2, 1, 0]. Here, the use of four bits of the physical memory address 402 for selecting the channel ID number, as defined by the first mode 202, allows physical memory addresses, such as the physical memory address 402, to be mapped across up to 16 channels (i.e., 2^4 channels, since the 4 bits at the bit indices 11, 10, 9, and 8 of the group of bits of the first aperture 406 are used by the SDF 170 to determine the channel ID number). In some embodiments, the number of physical memory address bits in the group of bits 408 (which include the group of bits to the right of the group of bits of the first aperture 406) determines the size of each set of sequential physical memory address to be mapped to a given channel. This size is sometimes referred to as the "interleaving granularity" and can be characterized as the maximum number of sequential bytes that are to be stored at each channel before switching to the next channel. Continuing the example, the number of bits included in the group of bits 408, denoted here as [7, 6, 5, 4, 3, 2, 1, 0], determines the interleaving granularity, in bytes, of the first mode 202. In this example, the interleaving granularity is 256 B (i.e., 2^8 B, since there are 8 bits in the group of bits 408 to the right of the group of bits 406, allowing for 256 combinations of those 8 bits, corresponding to 256 sequential physical memory addresses, and 1 B of data can be stored at each physical memory address).

Figure 5:
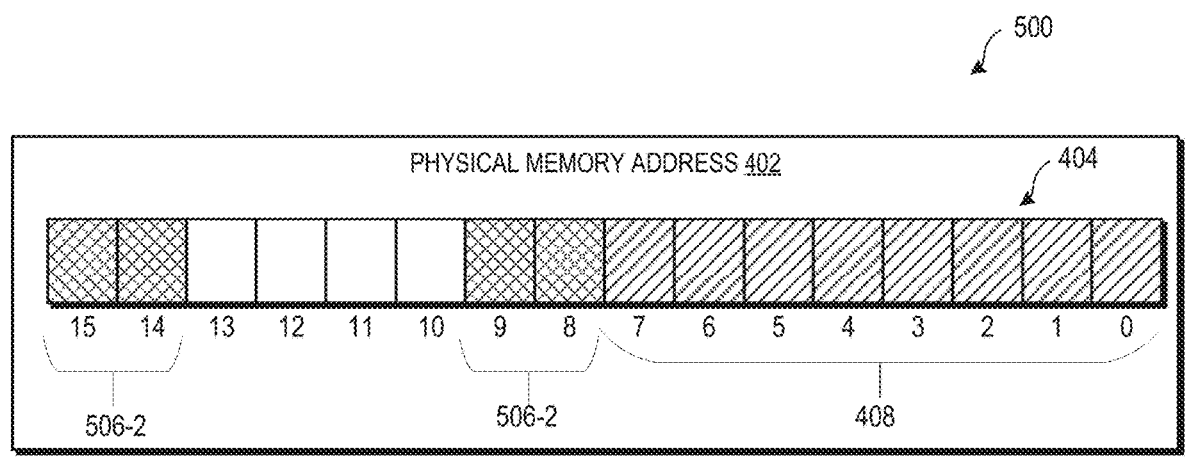
FIG. 5 is a block diagram of an indication at a physical address of a memory page of an allocation based on a second mode in accordance with some embodiments.

FIG. 5 shows a diagram illustrating a representation of an indication 500 of use of the second mode 204 of allocating a memory page to memory channels of a processing system. For ease of illustration, the present example is described with respect to an example implementation of the processing system 100 of FIG. 1 and its constituent components and modules.

In the present example, the modification of the memory channel allocation of the processing system 100 from the first mode 202 to the second mode 204 is performed by changing the group of bits of the physical memory address 402 that is used by the SDF 170 to map the physical memory address 402 to a particular subset of the channels 165-1, . . . , 165-N (e.g., from the group of bits of the first aperture 406 to the groups of bits 506-1, 506-2).

For example, in response to identifying that the memory page 302 only requires access by one of the partitions 102, 104, 106, the mode selector 175 selects the second mode 204 and indicates that the second mode 204 is in use by changing the group of bits used to determine the channel ID number of the channels 165-1, . . . , 165-N to which the physical memory address 402 is to be mapped from the group of bits of the first aperture 406 to the groups of bits of a second aperture 506-1, 506-2. In the illustrated example, indices 9, 8 indicate which local channels 165-1, . . . , 165-N the memory page 302 is allocated to and indices 15, 14 indicate a chip select.

Figure 6:
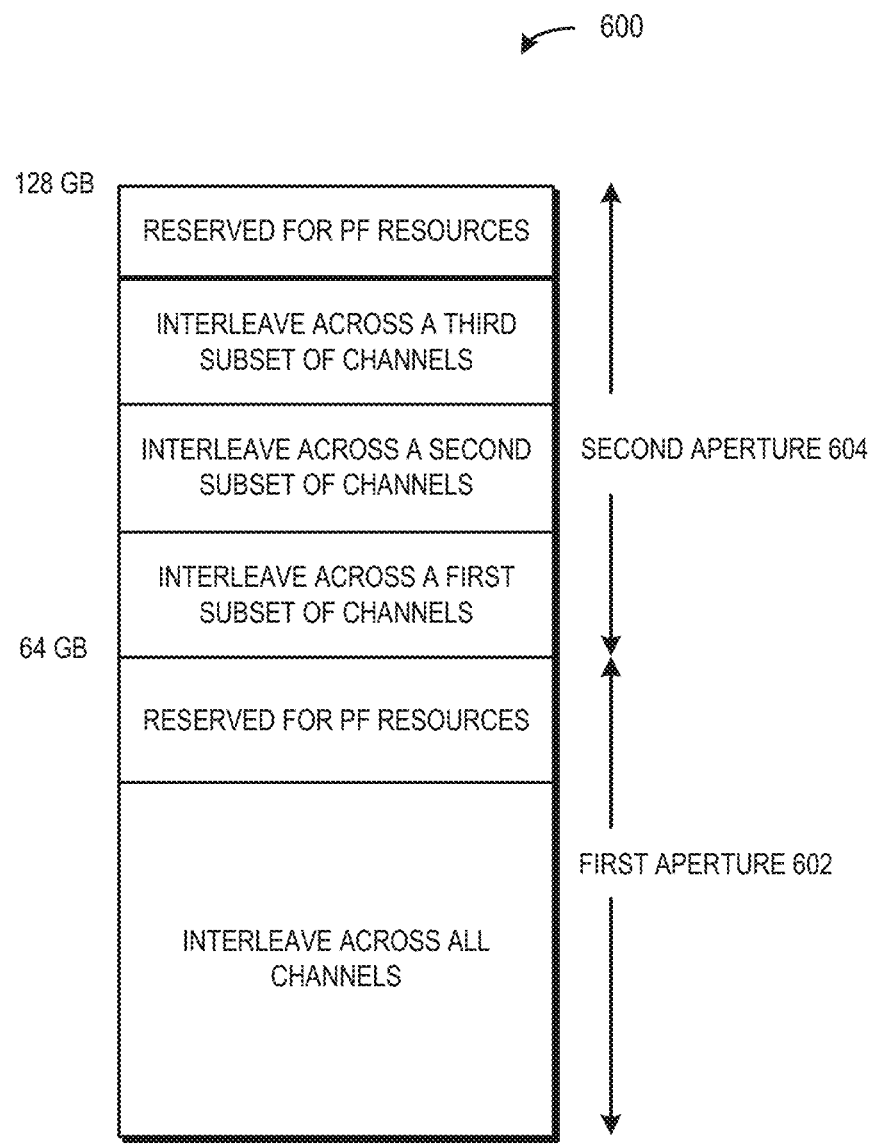
FIG. 6 is a block diagram of a physical address map of a DRAM that is dynamically allocated to subsets of memory channels in accordance with some embodiments.

FIG. 6 is a block diagram of a physical address map 600 of a DRAM that is dynamically allocated to subsets of memory channels in accordance with some embodiments. In the illustrated example, a 128 GB DRAM is divided into two apertures: the first 64 GB is allocated to a first aperture 602 and the second 64 GB is allocated to a second aperture 604. The majority of the first 64 GB allocated to the first aperture 602 is interleaved across all memory channels 206, while a portion of memory allocated to the first aperture 602 is reserved for physical function resources.

The second aperture 604 corresponds to portions of the DRAM that are interleaved across a first, second, and third subsets 208 of the memory channels. Similar to the first aperture 602, a portion of memory allocated to the second aperture 604 is reserved for physical function resources.

Figure 7:
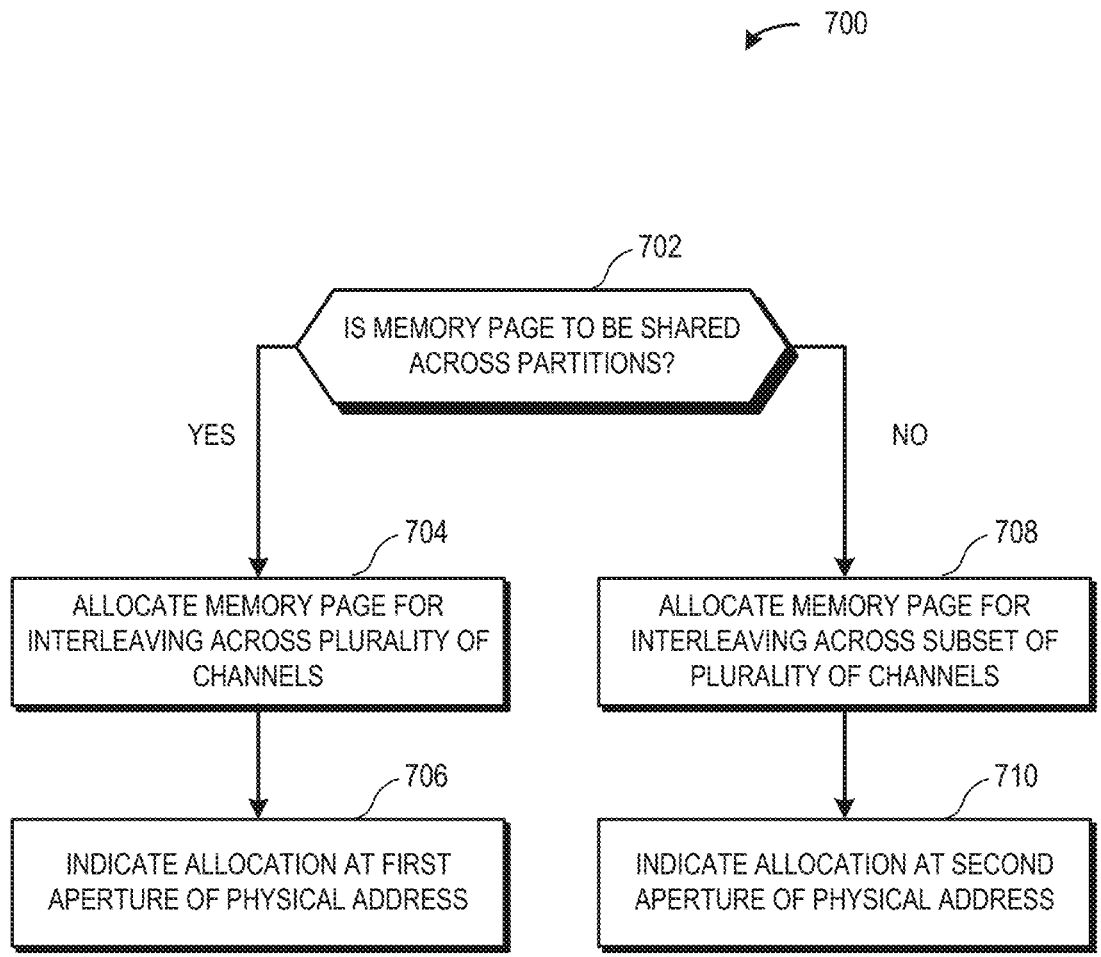
FIG. 7 is a flow diagram illustrating a method for allocating a memory page across varying numbers of channels in accordance with some embodiments.

FIG. 7 is a flow diagram illustrating a method 700 for allocating a memory page across varying numbers of channels in accordance with some embodiments. For ease of illustration, the method 600 is described with respect to an example implementation of the processing system 100 of FIG. 1 and its constituent components and modules.

At block 702, the mode selector 175 determines if a memory page 302 is to be shared by multiple partitions 104, 106, 108. If, at block 702, the mode selector 175 determines that the memory page 302 is to be shared across partitions 104, 106, 108, the method flow continues to block 704. At block 704, the kernel mode driver 145 selects the first mode 202 and allocates the memory page 302 for interleaving across the plurality of channels 165-0 through 165-N. At block 706, the kernel mode driver 145 indicates that the memory page 302 has been allocated according to the first mode 202 at a first aperture 406 of a physical address 402 of the memory page 302.

If, at block 702, the mode selector 175 determines that the memory page 302 is not to be shared across partitions 104, 106, 108, the method flow continues to block 708. At block 708, the kernel mode driver 145 selects the second mode 204 and allocates the memory page 302 for interleaving across a subset 208 of the plurality of channels 165-0 through 165-N. At block 710, the kernel mode driver 145 indicates that the memory page 302 has been allocated according to the second mode 204 at the second aperture 506-1, 506-2 of a physical address 402 of the memory page 302.

In some embodiments, the apparatus and techniques described above are implemented in a system including one or more integrated circuit (IC) devices (also referred to as integrated circuit packages or microchips), such as the processing system described above with reference to FIGS. 1-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
selectively allocating pages of memory for interleaving across one of:
a plurality of memory channels shared by a plurality of partitions of a processing system, each partition comprising a set of shader engines; and
a subset of the plurality of memory channels shared by a subset of the plurality of partitions.

2. The method of claim 1, wherein selectively allocating comprises:
in a first mode, allocating a page of memory to the plurality of memory channels; and
in a second mode, allocating the page of memory to the subset of the plurality of memory channels.

3. The method of claim 2, further comprising:
dividing each page of the pages of memory into a plurality of portions.

4. The method of claim 3, further comprising:
in the first mode, allocating each portion of the plurality of portions to each memory channel of the plurality of memory channels in round robin fashion; and
in the second mode, allocating each portion of the plurality of portions to each memory channel of the subset of the plurality of memory channels in round robin fashion.

5. The method of claim 2, further comprising:
selecting the first mode in response to the page of memory being shared by the plurality of partitions; and
selecting the second mode in response to the page of memory being shared by a subset of the plurality of partitions.

6. The method of claim 2, further comprising:
indicating use of the first mode at a first physical address aperture; and
indicating use of the second mode at a second physical address aperture.

7. The method of claim 6, wherein the first physical address aperture and the second physical address aperture comprise indices of a physical address of the page of memory identifying the memory channels to which the page of memory is to be allocated.

8. A processing system, comprising:
a plurality of partitions, each partition comprising a set of shader engines; and
a plurality of memory channels shared by the plurality of partitions, wherein a kernel mode driver is to selectively allocate pages of memory for interleaving across the plurality of memory channels in a first mode and a subset of the plurality of memory channels in a second mode.

9. The processing system of claim 8, wherein the first mode comprises allocating a page of memory to a unified memory architecture that is shared by the plurality of partitions and the second mode comprises a non-uniform memory architecture that is private to a single partition.

10. The processing system of claim 8, wherein the kernel mode driver is further to divide each page of the pages of memory into a plurality of portions.

11. The processing system of claim 10, wherein the kernel mode driver is to:
in the first mode, allocate each portion of the plurality of portions to each memory channel of the plurality of memory channels in round robin fashion; and
in the second mode, allocate each portion of the plurality of portions to each memory channel of the subset of the plurality of memory channels in round robin fashion.

12. The processing system of claim 8, wherein the kernel mode driver is to: indicate use of the first mode at a first physical address aperture; and
indicate use of the second mode at a second physical address aperture.

13. The processing system of claim 12, wherein the first physical address aperture and the second physical address aperture comprise indices of a physical address of a page of memory identifying the memory channels to which the page of memory is to be allocated.

14. A method, comprising:
interleaving a first memory page across a plurality of memory channels shared by a plurality of sets of shader engines in a first mode; and
interleaving a second memory page across a subset of the plurality of memory channels accessible a single set of shader engines in a second mode.

15. The method of claim 14, wherein the first mode comprises allocating the first memory page to a unified memory architecture that is shared by the plurality of sets of shader engines and the second mode comprises allocating the second memory page to a non-uniform memory architecture that is private to a subset of the plurality of sets of shader engines.

16. The method of claim 14, further comprising:
selecting the first mode in response to the first memory page being shared by the plurality of sets of shader engines; and
selecting the second mode in response to the second memory page being accessed by a single set of shader engines.

17. The method of claim 14, further comprising:
dividing each of the first memory page and the second memory page into a plurality of portions.

18. The method of claim 17, further comprising:
in the first mode, allocating each portion of the plurality of portions of the first memory page to each memory channel of the plurality of memory channels in round robin fashion; and
in the second mode, allocating each portion of the plurality of portions of the second memory page to each memory channel of the subset of the plurality of memory channels in round robin fashion.

19. The method of claim 14, further comprising:
indicating use of the first mode at a first physical address aperture; and
indicating use of the second mode at a second physical address aperture.

20. The method of claim 19, wherein the first physical address aperture and the second physical address aperture comprise indices of a physical address of a memory page identifying the memory channels to which the memory page is to be allocated.

* * * * *